United States Patent
Thellier et al.

(10) Patent No.: US 8,859,080 B2
(45) Date of Patent: Oct. 14, 2014

(54) GLASS PANEL WITH LOW LEVELS OF GHOST IMAGES

(75) Inventors: Hervé Thellier, Pimprez (FR); Simon Le Moal, Paris (FR); Cédric Marguerite, Saint-Leger-Aux-Bois (FR)

(73) Assignee: Saint-Gobain Glass France, Courbevoie (FR)

( * ) Notice: Subject to any disclaimer, the term of this patent is extended or adjusted under 35 U.S.C. 154(b) by 203 days.

(21) Appl. No.: 13/520,016

(22) PCT Filed: Dec. 20, 2010

(86) PCT No.: PCT/FR2010/052815
§ 371 (c)(1),
(2), (4) Date: Sep. 18, 2012

(87) PCT Pub. No.: WO2011/080464
PCT Pub. Date: Jul. 7, 2011

(65) Prior Publication Data
US 2013/0004719 A1     Jan. 3, 2013

(30) Foreign Application Priority Data

Dec. 31, 2009  (FR) .................................... 09 59695
Feb. 16, 2010  (FR) .................................... 10 51076
Nov. 30, 2010  (FR) .................................... 10 59915

(51) Int. Cl.
*B32B 3/00* (2006.01)
*B32B 17/06* (2006.01)
*B32B 17/10* (2006.01)

(52) U.S. Cl.
CPC ..... *B32B 17/10036* (2013.01); *B32B 17/10568* (2013.01); *B23B 17/10761* (2013.01)
USPC ............ 428/157; 428/156; 428/172; 428/426

(58) Field of Classification Search
CPC   B29C 47/003; B32B 17/10; B32B 17/10036; B32B 17/10568; B32B 17/1055; B32B 17/10559; B32B 17/10761; B32B 3/00; G02B 27/01
USPC ........... 428/156, 172, 426, 437, 157; 359/630
See application file for complete search history.

(56) References Cited

U.S. PATENT DOCUMENTS 3,453,161 A * 7/1969 Golightly ..................... 156/102
5,812,332 A  9/1998 Freeman

FOREIGN PATENT DOCUMENTS

DE   10 2008 008 758     8/2009
WO   WO 02103434 A1 * 12/2002

OTHER PUBLICATIONS

U.S. Appl. No. 14/113,323, filed Oct. 22, 2013, Le Moal.
International Search Report Issued Apr. 8, 2011 in PCT/FR10/52815 Filed Dec. 20, 2010.

* cited by examiner

*Primary Examiner* — Catherine A Simone
(74) *Attorney, Agent, or Firm* — Oblon, Spivak, McClelland, Maier & Neustadt, L.L.P.

(57) ABSTRACT

The present invention relates to a laminated glass panel including two sheets of glass connected by an adhesive interlayer, wherein in that in at least one direction, the thickness of the adhesive interlayer is sequentially increasing and decreasing or decreasing and increasing.

14 Claims, No Drawings

GLASS PANEL WITH LOW LEVELS OF GHOST IMAGES

The invention relates to the field of glass panels, in particular glass panels for automobiles, having a low level of ghost images.

BACKGROUND OF THE INVENTION

Automobile glass panels, in particular of the windshield or rear window type, must have a minimum of optical defects for reasons of safety and for aesthetic reasons. The driver's view must be as clear as possible and it is intolerable, in particular, for him to see ghost images of the environment from his car. The multiplication of the image seen by the driver through the windshield is a known occurrence deriving from multiple reflections at the air/glass interfaces. This is generally referred to as a ghost image even if, in theory, other additional images exist, because these additional images have a very low intensity. An additional reflection is in fact accompanied by a substantial loss of intensity of the undesirable image, by a factor of about 100 compared to the intensity of the main image. The scale of the problem is aggravated by the inclination of the glass panel.

It is known how to use a computer to calculate the level of the theoretical ghost image, which is expressed by the person skilled in the art by a FIGURE in minutes. This level depends on many factors, such as the variation in thickness of the windshield, the thickness of the sheets constituting the windshield, the local curvature, and also the viewing angle through the glass panel. The level of the vertical ghost image (the images appear above one another when one is seated in the vehicle) is distinguished from the level of the horizontal ghost image (the images appear next to one another when one is seated in the vehicle). Windshields having increasingly complex shapes are produced for aesthetic and functional reasons, and are discussed below. These complex shapes generate the vertical ghost image, but may also magnify the problems of horizontal ghost image in certain configurations, for example in zones of side bends with low curvature radii (panoramic windshield, etc.), the inclination of the normal to the windshield to the viewing angle being an aggravating factor.

The ghost image level is measured by the target test technique or the collimation-telescope test technique, as described in Regulation No. 43, Additive 42, of agreement E/ECE/324, E/ECE/TRANS/505, concerning the adoption of uniform technical requirements applicable to wheeled vehicles, equipment and parts that may be mounted or used on a wheeled vehicle, and the conditions of mutual recognition of the type approvals granted in accordance with these requirements.

Automobile manufacturers, in particular French manufacturers, design models with ever more innovative shapes. In particular, the windshields designed may be very large, because they sometimes even occupy a portion of the roof by extending above the front seat passengers. These windshields are also increasingly inclined to the horizontal. Moreover, their curvatures must be very uniform to blend easily into the general shape of the car. It is desirable in particular for the windshield to be continuous with the carbody pillars. Moreover, for safety reasons, it is desirable to broaden the viewing zone, especially at the sides. For this purpose, there is a tendency both to decrease the width of the carbody pillars, or even to set them back or eliminate them, and to prolong the side edges of the windshield backward.

BRIEF SUMMARY OF THE INVENTION

The invention deals in particular with the problem of the horizontal ghost image on the sides of a panoramic windshield or laminated glass panels of similar shapes, having side bends, particularly with pronounced curvatures, this ghost image problem being aggravated, as indicated above, especially if the glass panel is tilted to the vertical plane. In this summary and in the standard techniques for measuring the ghost image level mentioned above, the viewing angle is assumed to have a horizontal direction in the case of a windshield, but the particular ghost image problem of the invention can be transposed to any other viewing angle, in particular that of the driver and that of the passenger, fixed by the automobile manufacturers with non-horizontal directions.

The inventors have therefore attempted to solve the problem of a horizontal ghost image both as measured by standard techniques and as perceived by the driver and the passenger (for example, in the assembly position of a panoramic windshield).

They have achieved their goal by the invention, which relates to a laminated glass panel comprising two sheets of glass connected by an adhesive interlayer, and distinguished by the fact that in at least one direction, the thickness of the adhesive interlayer is sequentially increasing and decreasing or decreasing and increasing.

DETAILED DESCRIPTION OF THE INVENTION

The glass sheets constituting the laminated glass panel may be mineral, made from a float glass, or organic and made from a transparent polymer material such as polycarbonate (PC), polymethyl methacrylate (PMMA), ionomer resin, etc.

In a manner known per se, the adhesive interlayer is made from polyvinylbutyral (PVB), polyurethane (PU), etc. This layer has a complex shape here, with a thickness that is sequentially increasing and decreasing or decreasing and increasing, so that the ghost image seen through a glass panel of complex geometry is attenuated.

The thickness of the adhesive interlayer may increase then decrease over a short distance, for example close to the edge in a side zone of a pronounced bend or curvature and/or along the whole length of the windshield, for example, increasing in a left side zone and then decreasing in a right side zone.

The amplitude of the thickness variation of the interlayer in the laminated glass panel is at least 0.1 mm in the context of the invention.

Preferably, the thickness of the adhesive interlayer in the laminated glass panel is a continuous function in all directions. A stepwise profile of this thickness is therefore precluded. However, this continuity of interlayer thickness in the final laminated glass panel does not preclude surface irregularities up to 100 µm in size and/or a roughness of the interlayer before assembly of the laminate known in this field to promote the removal of the residual air located at the two glass/interlayer interfaces during the assembly process (degassing). These irregularities, and this roughness, are destroyed by the flow of the thermoplastic adhesive during the assembly.

In at least one edge zone of the glass panel, the thickness of the adhesive interlayer is advantageously increasing at increasing distance from the edge of the glass panel. This relates in particular to a side edge zone having a more or less pronounced curvature, such as a side bend zone of a panoramic windshield. In this particular embodiment, the thickness of the adhesive interlayer may be constant at the edge of the glass panel, then only increasing at a short distance from or close to it, in particular 30 to 350 mm from the edge of the glass panel.

Furthermore, the invention does not preclude the possibility that in an edge zone of the glass panel, the thickness of the adhesive interlayer decreases at increasing distance from the edge of the glass panel.

According to a preferred alternative, in two opposite edge zones of the glass panel, the thickness of the adhesive interlayer is increasing at increasing distance from the edge of the glass panel, these two edge zones being separated by a zone of the adhesive interlayer having a constant thickness. Thus, in the direction of a section of the glass panel connecting said two opposite edge zones, the thickness of the adhesive interlayer is alternately increasing, constant and decreasing. Said two opposite edge zones are then, for example, the two side zones of a panoramic windshield, in its assembly position.

According to the invention, the zones of the adhesive interlayer having a variable thickness make, for example, an angle of at least 0.05, preferably 0.1 and particularly preferably 0.15 mrad, and a maximum of 5, preferably 2 mrad.

The dimensions of the laminated glass panel of the invention, measured in three dimensions, that is to say, by following the complex shape (curvature) of the glass panel, are preferably those of a panoramic windshield: length between 1 and 2.5 m, and width between 0.4 and 2 m. The glass panel may be substantially square, with approximately the same length and width.

According to a privileged alternative of the invention, the laminated glass panel has a minimum radius of curvature of not more than 500 mm, or a docking angle of at least 35°. These features include many glass panels with complex geometries demanded by new aesthetic requirements and the quest for new functionalities, and the panoramic windshields in particular. With such characteristics, the problem of a horizontal ghost image is particularly acute.

A radius of curvature of not more than 500 mm corresponds to a pronounced curvature, present in side zones, for example.

To define the docking angle, the longitudinal median plane (possibly of symmetry) of the windshield is considered, and also the chord C connecting the two ends of the glass panel included in this longitudinal median plane. At any point P of this chord C, a plane perpendicular to C can be defined, of which the intersection with the windshield gives a section S(P) of glass panel. Each section S(P) forms a curve of which the ends correspond to two points M and M' located on the two opposite side edges of the glass panel (one is the driver side edge and the other is the passenger side edge). The chord D of the section S(P) therefore corresponds to the segment [MM']. The docking angle at a point M from the side edge of the glass panel is the angle made by the tangent to the section S(P) at M with the chord D.

Generally speaking, the docking angle (simply stated) of the windshield is the docking angle of the section S(P) of which the length of the associated chord D is the highest.

A docking angle of at least 35° indicates a high overall curvature of the glass panel (throughout its transverse dimension) and/or side bends combined with a pronounced curvature in the side zones.

The laminated glass panel of the invention may be convex in two mutually perpendicular directions and then have two bulge depths. For the person skilled in the art of automobile glass panels, "camber" is the highest transverse bulge depth (with regard to the automobile). For him, a double bulge is the highest longitudinal bulge depth (with regard to the automobile).

The laminated glass panel of the invention preferably has a camber of between 150 and 500 mm. For such values at least equal to 150 mm, the problem of a horizontal ghost image is particularly acute.

This is however also the case of laminated glass panels having a camber lower than 150 mm but at least equal to 50 mm, and locally having a pronounced bulge. Such glass panels are therefore obviously also within the scope of the invention.

The laminated glass panel of the invention also advantageously has a double bulge of between 0 and 180 mm.

The laminated glass panel of the invention is frequently symmetrical in its overall geometry, and may then in particular have a median plane of symmetry.

However, in a particular embodiment, the laminated glass panel is asymmetrical, to be adapted to an assembly environment with an asymmetrical geometry. The three-dimensional surface of this glass panel (for example its outer surface) does not have a plane of symmetry, because of the curve of this shape or because of its contour.

By analogy, it should be noted that the thickness of the adhesive interlayer of the laminated glass panel of the invention is itself frequently symmetrical about the abovementioned median plane of symmetry. In the case of a symmetrical geometry of the glass panel, the thickness symmetry of the interlayer may advantageously offer the possibility of making it from two identical halves, initially positioned symmetrically to one another about the median plane of symmetry.

When, on the contrary, the laminated glass panel does not have a symmetrical geometry, the thickness of the interlayer may nevertheless preserve this symmetry about the median plane. Thus the ghost image is itself corrected at the driver side edge for the driver, and similarly, at the passenger side edge for the passenger.

However, in a particular embodiment, it may be necessary to correct the driver side and passenger side ghost image in a preferred manner for the driver (at the risk of downgrading the correction for the passenger). In this case, according to this alternative, the adhesive interlayer in the laminated glass panel has an asymmetrical thickness. In this case, when the geometry of the laminated glass panel is symmetrical, the interlayer can be used equally for windshield assemblies of left-hand or right-hand drive vehicles. To switch from one to the other, it suffices to turn over the interlayer before assembling the laminate.

Furthermore, it must be indicated that the ghost image problem is lessened by decreasing the overall thickness of the laminated glass panel, hence of each of its constituent sheets. In this situation, the laminated glass panel of the invention includes sheets of glass having not necessarily equal thicknesses, the use of one glass sheet that is thinner than another (for example 1.4 mm instead of 2.1 mm) being advantageous.

The invention also relates to a transport vehicle, building or any structure including a laminated glass panel described above, the adhesive interlayer having a non-constant thickness in at least two substantially opposite side edge zones of the glass panel, in its assembly position. It relates in particular to an automobile having a panoramic windshield.

According to a preferred feature of this transport vehicle, this building or this structure, the laminated glass panel, in the assembly position, has a vertical median plane of symmetry, and the chord connecting the two points of intersection of this plane with the edge of the glass panel, is inclined by at least 15 and not more than 90, preferably 50° to the horizontal.

Other objects of the invention consist of
    a first method for manufacturing a laminated glass panel
        described above, comprising the preparation, by extrusion, of an adhesive interlayer having a non-constant thickness; extrusion is in fact perfectly suitable for producing plastic sheets having complex thickness gradients, in particular having two zones that are disjointed, or even distant from one another, each of which has a thickness gradient; the entirety of the adhesive interlayer is produced by extrusion, in one or more portions, like a mosaic; in the assembly position of the glass panel, a thickness variation of the adhesive interlayer is then advantageously observed along a transverse (rather than longitudinal) cross section with regard to the vehicle or other assembly environment;

a second method for manufacturing a laminated glass panel described above, comprising the preparation, by thermoforming, of an adhesive interlayer having a non-constant thickness; this technique procures an excellent reduction of the ghost image;

the use of a laminated glass panel described above for a land, air or sea transport vehicle, in particular as a windshield, rear window, side window or automobile roof, for buildings, street furniture, (bus shelter, hoarding, etc.), interior design (furniture, partition, shower booth, aquarium, etc.), electrical home appliances (refrigerator tray, etc.), and electronics (TV, computer screen, etc.).

The invention is illustrated by the following examples.

Example 1

Two panoramic windshields are produced by assembling two sheets made from float glass having a thickness of 2.1 mm, a length of 1491 mm and a width of 693 mm, using an adhesive interlayer of polyvinylbutyral. The length and width are measured here in two dimensions: they represent the highest chords connecting two opposite edges of the glass panel, in two perpendicular directions.

These panoramic windshields, having an identical geometry, have
 a camber of 310 mm,
 a double bulge of 9.2 mm,
 a minimum radius of curvature of 182 mm, reached in the two opposite side edge zones,
 and a docking angle of 69.2°.

These windshields have a median plane of symmetry (vertical and horizontal in the assembly position, with regard to the vehicle). The inclination to the horizontal of the chord connecting the two points of the edge of the glass panel belonging to this median plane is 39.53° in the assembly position.

The two windshields only differ in the constant thickness (0.76 mm) of the PVB layer of one, while the other has a thickness increasing from its side edges (from a value of 0.76 mm) to the median plane of symmetry, so that this thickness forms an angle of 0.49 mrad.

The ghost image is measured using an oriented laser according to Regulation No. 43, Additive 42 of agreement E/ECE/324, E/ECE/TRANS/505 already mentioned. The primary and secondary point images are measured on a screen at a distance of 7 m from the glass panel; the results are expressed in minutes.

Zones A, B and C are bounded on the glass panel, also according to the abovementioned regulation.

The results are given in Table 1 for the standard PVB windshield, and in Table 2 for the windshield with a variable-thickness PVB.

TABLE 1

Ghost image with standard PVB

| Height | Edge zone B Driver | Edge zone A Driver | Driver Side |
|---|---|---|---|
| Height B | 31.5 | | 9.6 |
| Height A | | 18.3 | 11.6 |
| Middle | 21.7 | 18.4 | 9.3 |
| Bottom A | | 18.1 | 8.9 |
| Bottom B | 18.3 | | 12.6 |

TABLE 2

Ghost image with PVB at corner (0.49 mrad)

| Height | Edge zone B Driver | Edge zone A Driver | Driver Side |
|---|---|---|---|
| Height B | 26.8 | | 8.9 |
| Height A | | 14.9 | 10.4 |
| Middle | 21.3 | 13.1 | 4.3 |
| Bottom A | | 16.2 | 4.8 |
| Bottom B | 17.2 | | 6.9 |

The measurements are taken at various heights along vertical lines.

Edge zone B driver means: driver side boundary between zone B and zone C.

Edge zone A driver means: driver side boundary between zone A and zone B.

Driver side means: middle of the driver side half of zone A.

It is confirmed that thanks to the invention, the ghost image is decreased.

Example 2

The preceding example is reproduced, using as the adhesive interlayer:
 on each of the two side edges of the glass panel, a 30 cm wide PVB strip, having a thickness ranging from 0.38 to 0.76 mm from the side edge of the glass panel to its center, and obtained as described below, and
 in the median part of the glass panel, a PVB sheet having a constant thickness of 0.76 mm.

The two PVB strips of variable thickness are obtained by thermoforming, localized drawing as follows.

The operation takes place in a white room at 16° C. and 35% relative humidity.

A 0.76 mm thick standard PVB sheet is heated from a temperature of 15° C. to 120° C. This sheet is stretched horizontally between two gripping means.

The local drawing of the PVB is obtained by raising a mold (solid) at 25° C. characterized by a shape having an angle of 40° to the horizontal. The mold thus progressively comes into contact with the PVB sheet, of which the thickness is fixed at its value upon entering into contact with the mold. In this way, a strip of PVB that is 30 cm wide and has a thickness of between 0.38 and 0.76 mm is obtained. The temperature of the PVB measured after contact thermoforming with the mold is 70° C.

This variation in thickness of the PVB sheet is identically observed in the laminate assembled in the usual conditions, particularly including heating of the PVB to an approximate temperature of 145° C.

The ghost image measured at edge zone A driver—middle is 7.8 minutes.

The technique of localized drawing of the PVB by thermoforming employed here therefore proves to be excellent for limiting the ghost image phenomenon.

The invention claimed is:

1. A laminated glass panel comprising two sheets of glass connected by an adhesive interlayer, wherein in at least one direction, the thickness of the adhesive interlayer is sequentially increasing and decreasing or decreasing and increasing, and wherein the laminated glass panel has a camber of 150 to 500 mm.

2. The laminated glass panel as claimed in claim 1, wherein in all directions, the thickness of the adhesive interlayer is a continuous function.

3. A laminated glass panel as claimed in claim 1, wherein in at least one edge zone of the glass panel, the thickness of the adhesive interlayer is increasing at increasing distance from the edge of the glass panel.

4. The laminated glass panel as claimed in claim 3, wherein in two opposite edge zones of the glass panel, the thickness of the adhesive interlayer is increasing at increasing distance from the edge of the glass panel, these two edge zones being separated by a zone of the adhesive interlayer having a constant thickness.

5. The laminated glass panel as claimed in claim 1, wherein its length is between 1 and 2.5 m, and its width is between 0.4 and 2 m.

6. The laminated glass panel as claimed in claim 1, wherein it has a minimum radius of curvature of not more than 500 mm, or a docking angle of at least 35°.

7. The laminated glass panel as claimed in claim 1, wherein it is asymmetrical.

8. The laminated glass panel as claimed in claim 1, wherein the adhesive interlayer has an asymmetrical thickness.

9. A transport vehicle comprising a laminated glass panel as claimed in claim 1, wherein the adhesive interlayer has a non-constant thickness in at least two substantially opposite side edge zones of the glass panel, in its assembly position.

10. The transport vehicle as claimed in claim 9, wherein the laminated glass panel, in its assembly position, has a vertical median plane of symmetry, and in that the chord connecting the two points of intersection of this plane with the edge of the glass panel, is inclined by at least 15° and not more than 90° to the horizontal.

11. A method for manufacturing a laminated glass panel as claimed in claim 1, wherein it comprises the preparation, by extrusion, of an adhesive interlayer having a non-constant thickness.

12. A method for manufacturing a laminated glass panel as claimed in claim 1, wherein it comprises the preparation, by thermoforming, of an adhesive interlayer having a non-constant thickness.

13. A building comprising a laminated glass panel as claimed in claim 1, wherein the adhesive interlayer has a non-constant thickness in at least two substantially opposite side edge zones of the glass panel, in its assembly position.

14. The building as claimed in claim 13, wherein the laminated glass panel, in its assembly position, has a vertical median plane of symmetry, and in that the chord connecting the two points of intersection of this plane with the edge of the glass panel, is inclined by at least 15° and not more than 90° to the horizontal.

* * * * *